United States Patent [19]

Hutter et al.

[11] Patent Number: 5,230,876
[45] Date of Patent: Jul. 27, 1993

[54] REMOVAL OF VANADIUM FROM PHOSPHORIC ACID

[75] Inventors: Klaas J. Hutter, Pocatello; David K. Johnson, Chubbuck; Gene Kawakami, Pocatello; Gary Long, Inkom, all of Id.

[73] Assignee: J. R. Simplot Co., Pocatello, Id.

[21] Appl. No.: 701,879

[22] Filed: May 17, 1991

[51] Int. Cl.$^5$ .................. C01B 25/16; C01G 31/00; B01D 16/00
[52] U.S. Cl. .................. 423/321 R; 423/62; 423/63; 423/64; 423/65
[58] Field of Search .................. 423/321 R, 321 S, 62, 423/63, 64, 65

[56] References Cited

U.S. PATENT DOCUMENTS

| | | | |
|---|---|---|---|
| 2,130,579 | 9/1938 | Bowman | 23/19 |
| 2,830,874 | 4/1958 | Long et al. | 23/18 |
| 4,327,061 | 4/1982 | Hermann et al. | 423/63 |
| 4,851,199 | 7/1989 | Young | 423/321 R |

Primary Examiner—Gregory A. Heller
Attorney, Agent, or Firm—Gregory Garmong

[57] ABSTRACT

An apparatus for removing vanadium from phosphoric acid includes a precipitator that receives vanadium-containing process-feed phosphoric acid and adds an oxidant to the process-feed phosphoric acid, whereupon precipitates containing phosphorus and vanadium are formed in a phosphoric acid filter feed slurry. The solid precipitate is removed by a filter. The filtrate, after optional further oxidation, is contacted to an ion exchange resin to remove additional vanadium from the filtrate to produce a phosphoric acid product of reduced vanadium content. A first portion of the phosphoric acid product is removed from the apparatus for further use. A reducing agent is added to a second portion of the phosphoric acid product, and the reduced acid is used to strip vanadium from the loaded ion exchange resin. The vanadium-loaded second portion of the phosphoric acid is mixed with fresh phosphoric acid and fed to the precipitator. The phosphoric acid in the precipitator has a phosphate content of from about 40–45 percent, and at least a portion of the phosphoric acid in the precipitator is produced by diluting more concentrated phosphoric acid to the 40–45 percent phosphate range.

20 Claims, 2 Drawing Sheets

5,230,876

REMOVAL OF VANADIUM FROM PHOSPHORIC ACID

BACKGROUND OF THE INVENTION

This invention relates to the purification of phosphoric acid, and, more particularly, to the removal of vanadium from phosphoric acid.

Phosphoric acid is widely used in commerce in the manufacture of various products, such as animal feed, food products, and fertilizer. Phosphoric acid is prepared by mining phosphate-containing ores and then producing an acid from those ores. In the "wet process", sulfuric acid is contacted to the mined ore, dissolving the phosphate values from the ore into the acid. The resulting dilute phosphoric acid is then concentrated and processed to produce the required grade and purity of phosphoric acid.

In addition to the phosphate values, the sulfuric acid also dissolves other elements and compounds from the ore into the acid. These dissolved elements and compounds may be deleterious to the purity or properties of the final phosphoric acid, and therefore must be removed during the processing for certain applications. One such impurity is vanadium. The phosphate-containing ore mined in eastern Idaho typically contains about 0.1–0.3 percent vanadium. The dilute phosphoric acid initially produced in the wet process production of phosphoric acid from such ore typically contains about 0.06–0.18 percent vanadium.

This vanadium content is too large for applications such as animal feed supplements. The vanadium content must be reduced during the processing so that the phosphorus-to-vanadium weight ratio in the acid is equal to or greater than about 700:1. This phosphorus-to-vanadium weight ratio corresponds to a maximum of about 460 parts per million of $V_2O_5$ in phosphoric acid of 42 percent $P_2O_5$ content.

The problem of high vanadium levels in phosphoric acid produced from Idaho phosphates (as well as those of some other regions) has been known for over 50 years. There have been several techniques developed for reducing the vanadium content. In a precipitation technique such as that described in U.S. Pat. No. 2,130,579, an oxidizing agent is added to the vanadium-containing phosphoric acid to oxidize the vanadium to the pentavalent oxidation state. Insoluble compounds containing vanadium and phosphate precipitate from such solutions. With conventional commercial processing, the $V_2O_5$ content of the filtrate is typically 500–900 parts per million, too high for use in animal feed supplements. Extension of the precipitation time to reduce the vanadium content to acceptably low levels requires excessively long precipitation times and large acid cooling requirements, is not sufficiently reproducible, and cannot achieve sufficiently low vanadium levels for some uses of the acid.

Solvent extraction has been used to reduce the vanadium levels of phosphoric acid. Such processes are described, for example, in U.S. Pat. Nos. 3,700,415; 3,374,696; 3,437,454; 3,415,616; and 3,449,074. While operable, such solvent extraction processes have the disadvantages that the organic solvent may become entrained in the product phosphoric acid, most organic solvents are flammable, and there may be formed gummy residue phases under some circumstances that could damage rubber-lined equipment.

In an ion exchange approach, such as described in U.S. Pat. No. 2,830,874, an oxidizer is added to the vanadium-rich phosphoric acid to raise the vanadium to the pentavalent oxidation state. The pentavalent vanadium is adsorbed by an ion exchange resin, reducing the vanadium content of the product phosphoric acid. The vanadium is stripped from the loaded resin with phosphoric acid to which a reducing agent has been added. The vanadium is thereby reduced to the trivalent or tetravalent oxidation state, so that it desorbs from the ion exchange resin into the strip solution. The regenerated ion exchange resin is reused. The concentrated strip solution must be disposed of or treated in some manner. Ion exchange processes can regularly reduce the vanadium content of the acid to a sufficiently low level for use in animal feed supplements. However, ion exchange processes are expensive because of the large volume of resin required, limited resin life, and the slow ion exchange rates during the loading and stripping/regeneration steps.

There is a need for an improved approach to the production of low-vanadium-content phosphoric acid, suitable for commercial application. The present invention fulfills this need, and further provides related advantages.

SUMMARY OF THE INVENTION

The present invention provides an apparatus and process for the removal of vanadium from phosphoric acid that is economical compared with alternative approaches, and can achieve low vanadium contents in the product. There is no waste product stream requiring expensive further processing or disposal. No organic solvents are used.

In accordance with the invention, apparatus for removing vanadium from phosphoric acid comprises precipitator means for processing vanadium-containing process-feed phosphoric acid having a phosphate content of no more than about 45 percent. The precipitator means includes oxidant addition means for adding an oxidant to the process-feed phosphoric acid to place the vanadium ions in the acid into the pentavalent oxidation state, whereupon precipitates containing vanadium are formed in a phosphoric acid slurry. The phosphoric acid slurry is provided to a separation means which separates the precipitates from the phosphoric acid slurry to remove vanadium from the phosphoric acid stream and to form a vanadium-reduced ion exchange feed.

Additional vanadium is removed from the phosphoric acid by an ion exchange means that includes contacting means for holding ion exchange resin and for contacting the ion exchange feed to the ion exchange resin to produce a phosphoric acid product of reduced vanadium content. A first portion of the phosphoric acid product is removed from the apparatus for further use.

The ion exchange resin is regenerated for reuse by ion exchange resin strip means for stripping vanadium from the loaded contacting means. The ion exchange resin strip means strips vanadium from the ion exchange resin by contacting a second portion of the phosphoric acid product to the vanadium-loaded ion exchange resin, after adding a reducing agent to the second portion of the phosphoric acid product so that vanadium ions in the acid are reduced to the trivalent and tetravalent states and transferred from the ion exchange resin to the second portion of the phosphoric acid product.

The vanadium-containing second portion of the phosphoric acid product is mixed with makeup fresh vanadium-containing phosphoric acid having a P2O5 content of no more than about 45 percent. The resulting process-feed phosphoric acid is conducted to the precipitator.

Vanadium is removed from the apparatus only by the separation means, which is preferably a filter, that separates the precipitated vanadium-phosphate compound from the phosphoric acid. The filter cake is readily dewatered, dried, and purified as necessary, so that there is no liquid vanadium-containing stream for disposal or processing. The precipitation processing prior to separation is from a relatively concentrated solution, and therefore is fast and efficient. Smaller precipitation tanks and shorter holding times are utilized, as compared with precipitation from less concentrated solutions. There is no attempt to reduce the vanadium content to very low levels in the precipitator, as the ion exchange processing accomplishes this reduction.

The phosphoric acid from the precipitator and separator (filter) is contacted under oxidizing conditions to ion exchange resin, preferably contained in two or more discrete containers. The vanadium level of the phosphoric acid is reduced as the vanadium is transferred to the ion exchange resin. The containers of ion exchange resin may be arranged in stages, with as many stages as necessary used to reach the desired vanadium content. However, a single stage has been found sufficient for many uses of the product phosphoric acid. For animal feed grade phosphoric acid, the phosphorus-to-vanadium weight ratio should be at least about 700:1. As an example of the sizing requirements, 1-2 stages of ion exchange, each stage containing 100 cubic feet of resin, have been found to be sufficient to produce animal feed grade phosphoric acid for a flow rate of 80 gallons per minute of acid.

The removal of vanadium by ion exchange, following a precipitation process, has the advantage that the total loading of vanadium onto the ion exchange resin is much lower than if all the vanadium were removed by ion exchange. The required amount of the expensive ion exchange resin and of the oxidation and reduction reagents used in ion exchange is much less. Smaller reactors are used, and the stripping problem is greatly reduced. Since less vanadium (by weight) is removed by ion exchange in the combination process of the invention as compared by a conventional ion exchange process, the ion exchange equipment may be smaller and less costly. Moreover, the initial precipitation process produces a feed stream to the ion exchange unit having a nearly constant vanadium content which permits the ion exchange unit to be optimally designed and operated for that vanadium content. Absent such a precipitation process in the feed stream to the ion exchange unit, variations in the vanadium content of the ore would cause variations in the input stream to the ion exchange unit and make optimal design and operation more difficult.

A first portion of the resulting phosphoric acid is removed from the apparatus as low-vanadium acid, and used in subsequent processes.

The ion exchange process produces containers of vanadium-loaded ion exchange resin that are taken off line from the ion exchange unit as they become loaded with vanadium. The vanadium is stripped in a reducing environment by passing reduced phosphoric acid through the loaded exchange resin, which desorbs trivalent and tetravalent vanadium into the acid. The phosphoric acid is conveniently supplied as a second portion of the product phosphoric acid produced in the ion exchange unit.

Makeup phosphoric acid may be added at this point. The makeup acid replaces that removed as low-vanadium product phosphoric acid, and can be considered the raw material feed to the process. The makeup phosphoric acid is preferably prepared by diluting merchant grade phosphoric acid of 52 percent $P_2O_5$ content or superphosphoric acid of 68-72 percent $P_2O_5$ content with water, down to a $P_2O_5$ content of from about 40-45 percent, preferably 42-44 percent. It has been found that if the acid reaching the ion exchange apparatus has a $P_2O_5$ content of more than about 45 percent, effective exchange cannot occur, and above a content of about 47 percent, essentially no effective ion exchange occurs. On the other hand, the $P_2O_5$ content of the phosphoric acid should be as high as possible to promote process efficiency, and below about 40 percent $P_2O_5$ content the ion exchange process becomes substantially less efficient.

Preparation of the more concentrated saturated acid and then diluting it to the 40-45 percent $P_2O_5$ content stabilizes the acid and ensures that undesired precipitation of other species in the apparatus will not occur. That is, 40-45 percent $P_2O_5$ phosphoric acid directly concentrated from more dilute acid is not the equivalent of 40-45 percent $P_2O_5$ phosphoric acid produced by first concentrating dilute acid to a more concentrated state, typically 52 percent $P_2O_5$, and then diluting the concentrated acid back to a 40-45 percent $P_2O_5$ content. The 40-45 percent $P_2O_5$ acid produced by direct concentration has constituents in the saturated and/or supersaturated state, while the 40-45 percent $P_2O_5$ acid produced by concentrating and then diluting has these same constituents present in an unsaturated state. In the preparation of phosphates for animal feed, a preferred application for the present invention, fluorine in the phosphoric acid must be removed subsequent to the vanadium removal by steam stripping the fluoride from diluted acid (which is not a part of the present invention), and therefore water would necessarily be added even if the acid were not diluted as part of the present process. The diluting of the acid prior to vanadium removal therefore does not impose a cost penalty on the process.

To avoid the need for disposing of or further processing the vanadium-loaded strip solution, it is cycled back to the precipitation processing, together with the makeup feed of phosphoric acid. The oxidation state of the vanadium in the mixture of strip phosphoric acid and makeup feed phosphoric acid is not well defined, but is typically not the fully oxidized pentavalent oxidation state required for precipitation processing. The acid mixture is therefore preferably again oxidized with an oxidant such as manganese dioxide. The resulting process-feed phosphoric acid provides the input stream for the precipitator, where it may be further oxidized and seeded with crystals to promote precipitation of vanadium-phosphate compounds.

The present approach is therefore a closed system except for inputs of raw phosphoric acid, oxidizing agents, and reducing agents, and outputs of solid phosphovanadic acid filter cake and the purified product acid suitable for subsequent processing. No separate strip stream need be disposed of or processed, and filter cake wash water is used as the source of dilution water for acid stabilization.

Substantial savings are obtained by utilizing the new approach of the invention. Isotherm data indicates that, in the prior approach where only ion exchange is used to remove the vanadium, six stages of absorption, each with 100 cubic feet of resin, are required when treating 40 gallons per minute of 42 percent $P_2O_5$ acid to reduce the $V_2O_5$ content from 1600 to 440 parts per million. For the present approach, only two stages of absorption are necessary to reduce the $V_2O_5$ content from 700 parts per million (achieved by the precipitation stage) to 440 parts per million. For typical resin lifetimes and costs, the savings in ion exchange resin costs alone with the present approach is about $7.50 per ton of $P_2O_5$ treated. Additionally, there is a savings in the amount of reductant (such as elemental iron) required in the present process, of about $4.00 per ton, and a savings in the amount of oxidant of about $1.00 per ton. The total savings in resin and consumable chemicals of the present approach over the prior approach is therefore estimated to be on the order of $12.50 per ton of $P_2O_5$, with no increased capital costs because the cost of the precipitation equipment is roughly offset by the capital cost savings in the reduced number of ion exchange stages.

As compared to a stand-alone precipitation process operated to reduce the vanadium content to a level acceptable for animal feed supplements, the present approach reduces the time required for crystallization of the precipitate, leading to reduced equipment size, and the cooling requirements of the acid are smaller.

Other features and advantages of the invention will be apparent from the following more detailed description of the preferred embodiments, taken in conjunction with the accompanying drawings, which illustrate, by way of example, the principles of the invention.

DETAILED DESCRIPTION OF THE PREFERRED EMBODIMENT

In accordance with a preferred embodiment of the invention, apparatus for removing vanadium from phosphoric acid comprises a precipitator that receives vanadium-containing process-feed phosphoric acid and adds an oxidant to the process-feed phosphoric acid to place the vanadium ions in the acid into the pentavalent oxidation state. As a result, solid precipitates containing phosphates and vanadium are formed in a phosphoric acid filter feed slurry. The filter feed slurry from the precipitator is provided to a filter that removes solid precipitate therefrom to produce a phosphoric acid filtrate having a reduced vanadium content. An ion exchange unit receives the filtrate phosphoric acid from the filter and contacts the filtrate phosphoric acid to an ion exchange resin supported in containers within the ion exchange unit, thereby removing additional vanadium from the filtrate phosphoric acid by loading vanadium onto the ion exchange resin to produce a phosphoric acid product of reduced vanadium content. A first portion of the phosphoric acid product is removed from the apparatus for further use. An ion exchange resin strip unit controllably and intermittently contacts a second portion of the phosphoric acid product to the vanadium-loaded ion exchange resin, adds a reducing agent to the second portion of the phosphoric acid product so that vanadium ions in the acid are reduced to the trivalent and tetravalent states and transferred from the ion exchange resin to the second portion of the phosphoric acid product. The vanadium-containing second portion of the phosphoric acid product is provided to the precipitator as part of the process-feed phosphoric acid.

The present invention also extends generally to the processing of phosphoric acid to remove vanadium. In accordance with this aspect of the invention, a process for removing vanadium from phosphoric acid includes the step of precipitating a compound containing vanadium and phosphorus from a process-feed phosphoric acid having the vanadium in the pentavalent oxidation state. The solid precipitate is separated from the phosphoric acid. Additional vanadium is removed from the phosphoric acid by contacting the phosphoric acid resulting from the step of separating to an ion exchange resin to produce a product phosphoric acid having reduced vanadium content. The vanadium is stripped from the ion exchange resin by contacting phosphoric acid stripping solution to the ion exchange resin in the presence of a reducing agent that reduces the vanadium ions to the the trivalent and tetravalent oxidation state. The vanadium-loaded stripping solution, together with makeup vanadium-containing fresh phosphoric acid, is oxidized so that the vanadium is in the pentavalent oxidation state, and supplied to the step of precipitating.

Figure 1:
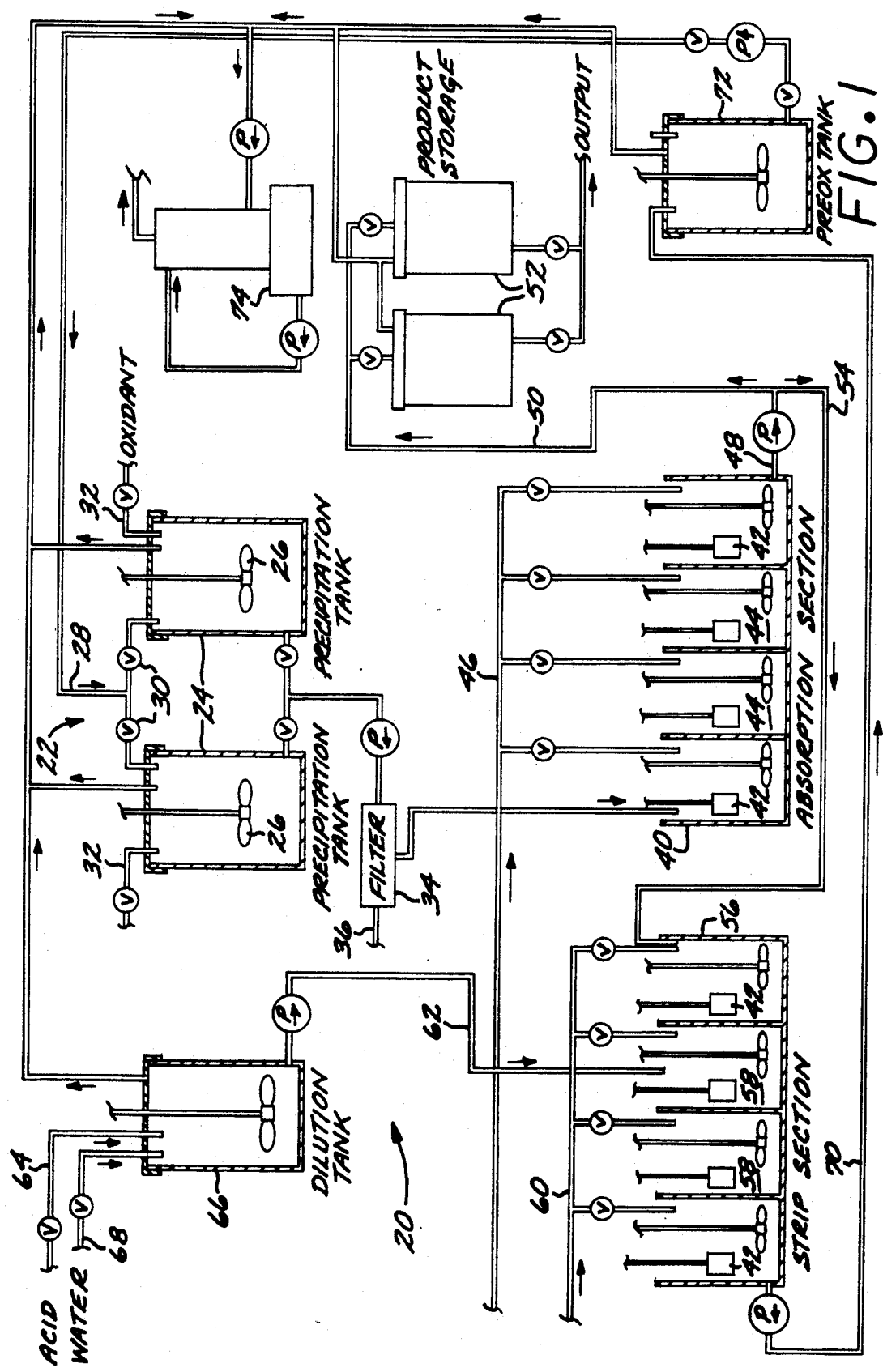
FIG. 1 is a flow chart of a first embodiment of the process of the invention.

FIG. 1 illustrates the flow of material into, out of, and through an apparatus 20 for removing vanadium from phosphoric acid. A precipitator 22 includes at least one, and preferably two, tanks 24 having stirrers 26 therein. A process-feed phosphoric acid line 28 supplies vanadium-rich acid to the tanks 24, through valves 30 that permit the tanks 24 to be alternately filled. An oxidant such as $MnO_2$ or $NaClO_3$ is supplied to the acid in the tanks 24 through individual oxidant feed lines 32.

When vanadium ions are in their pentavalent oxidation state in phosphoric acid, they react with the phosphates in the acid to form insoluble precipitates. To achieve a maximum degree of precipitation and obtain filterable precipitates, the precipitation process requires a number of hours at a constant temperature of about 30°-50° C. The apparatus can be operated in continuous, semi-continuous, or batch modes, but in any event the flow rates and times are adjusted so that the mean residence time of acid in the tanks 24 is from about 6 to about 48 hours, most preferably about 14 to about 20 hours. Precipitation can be, and preferably is, accelerated by seeding the acid in the tanks 24 with small crystals of the vanadium phosphate compound phosphovanadic acid (PVA), usually represented as $V_2O_5\cdot P_2O_5\cdot xH_2O$, where x is about 3–4.

The precipitator 22 can be operated in an economical fashion to achieve relatively rapid, but not complete, removal of vanadium from the acid. It is not necessary to attempt to remove the last remaining traces of vanadium in the precipitator 22.

A slurry of solid precipitates in phosphoric acid is withdrawn from the tanks 24 and pumped to a filter 34 that separates the precipitated material from the acid filtrate. The solid precipitate is dewatered and pressed to a filter cake that is removed from the apparatus 20, as depicted at numeral 36, and which may be reslurried and refiltered to recover more of the phosphate content. This filtered material 36 is the only form in which vanadium is removed from the apparatus 20, and is in a convenient form that can be further processed to recover the vanadium values or disposed of as may be convenient.

The filtrate phosphoric acid is piped to an ion exchange unit 40. An ion exchange resin such as a weak basic resin with a macroporous matrix such as Duolite A 368 is packaged in containers 42 made of a 60 mesh screen material. The containers 42 are arranged in four stages 44 within the ion exchange unit 40. The stages 44 are four separate, individually stirred compartments within the ion exchange unit 40, with the containers 42 hanging down into the compartments. Phosphoric acid continuously overflows from one stage to the next. An oxidant such as $MnO_2$ or $NaClO_3$ is added to each stage 44 through an oxidant line 46. The oxidant maintains the vanadium ions in the acid in the pentavalent oxidation state. In this state, the vanadium ions are adsorbed to the ion exchange resin particles. The resin within each container 42 gradually becomes loaded and saturated with vanadium, and is then removed for stripping of the vanadium as will be described subsequently.

A purified phosphoric acid product 48 flows from the ion exchange unit 40. A first portion 50 of the product acid 48 flows to storage tanks 52 for temporary storage and later use. A second portion 54 of the product acid 48 flows to an ion exchange strip unit 56.

The ion exchange strip unit 56 is divided into four individually stirred stages 58 in which a container 42 can be placed after the ion exchange resin in the container 42 has become loaded with vanadium in the ion exchange unit 40. Second portion 54 product acid flows through the stages 58. Simultaneously, a reducing agent such as elemental iron is added as a slurry to the stages 58 through a reducing agent line 60. The reducing agent added to the stages 58 reduces the vanadium loaded on the ion exchange resin to the trivalent (+3) or tetravalent state (+4) oxidation state. The vanadium desorbs from the ion exchange resin and into the phosphoric acid.

A flow of makeup phosphoric acid 62 is added to the ion exchange strip unit 56 at an intermediate location, illustrated in FIG. 1 to be the third stage. The makeup acid dilutes the acid and prevents saturation of the phosphoric acid by the desorbed vanadium in the strip unit 56. The flow rate of the makeup acid 62 is adjusted to replace the volume of the first portion 50 removed from the apparatus 20.

The makeup acid 62 is prepared by first concentrating dilute (25-30 percent $P_2O_5$ content) acid produced in the wet process to merchant grade acid of about 50 to 55 percent $P_2O_5$ content, numeral 64. The merchant grade acid flow 64 is provided to a stirred diluting tank 66, together with an appropriate amount of water, numeral 68, to dilute the acid in the tank to about 42-44 percent $P_2O_5$. The diluting of a more concentrated acid stabilizes the acid and prevents undesirable precipitation of, or scaling by, constituents present in the acid such as gypsum, fluosilicates, or complex iron and aluminum phosphates.

Together, the makeup acid 62 and second portion acid 54 carry all of the vanadium stripped from the ion exchange resin in the containers 42. After the ion exchange resin in a container has been sufficiently stripped of vanadium, the container 42 of regenerated ion exchange resin is reused in the ion exchange unit 40.

An outflow stream 70 from the ion exchange strip unit 56, containing trivalent and tetravalent vanadium ions in phosphoric acid, flows to a stirred preoxidation tank 72. An oxidizer such as nitric acid is added to the phosphoric acid in the tank 72 to oxidize the vanadium to the tetravalent oxidation state and the ferrous iron to ferric iron. The outflow of the preoxidation tank 72 is the inflow or process-feed acid 28 provided to the precipitator 22.

The various tanks 24, 52, 66, and 72 which may produce noxious fumes are provided with hoods that draw off the fumes. The fumes are conducted to a gas scrubber 74 which removes the fumes from the gas flow.

Figure 2:
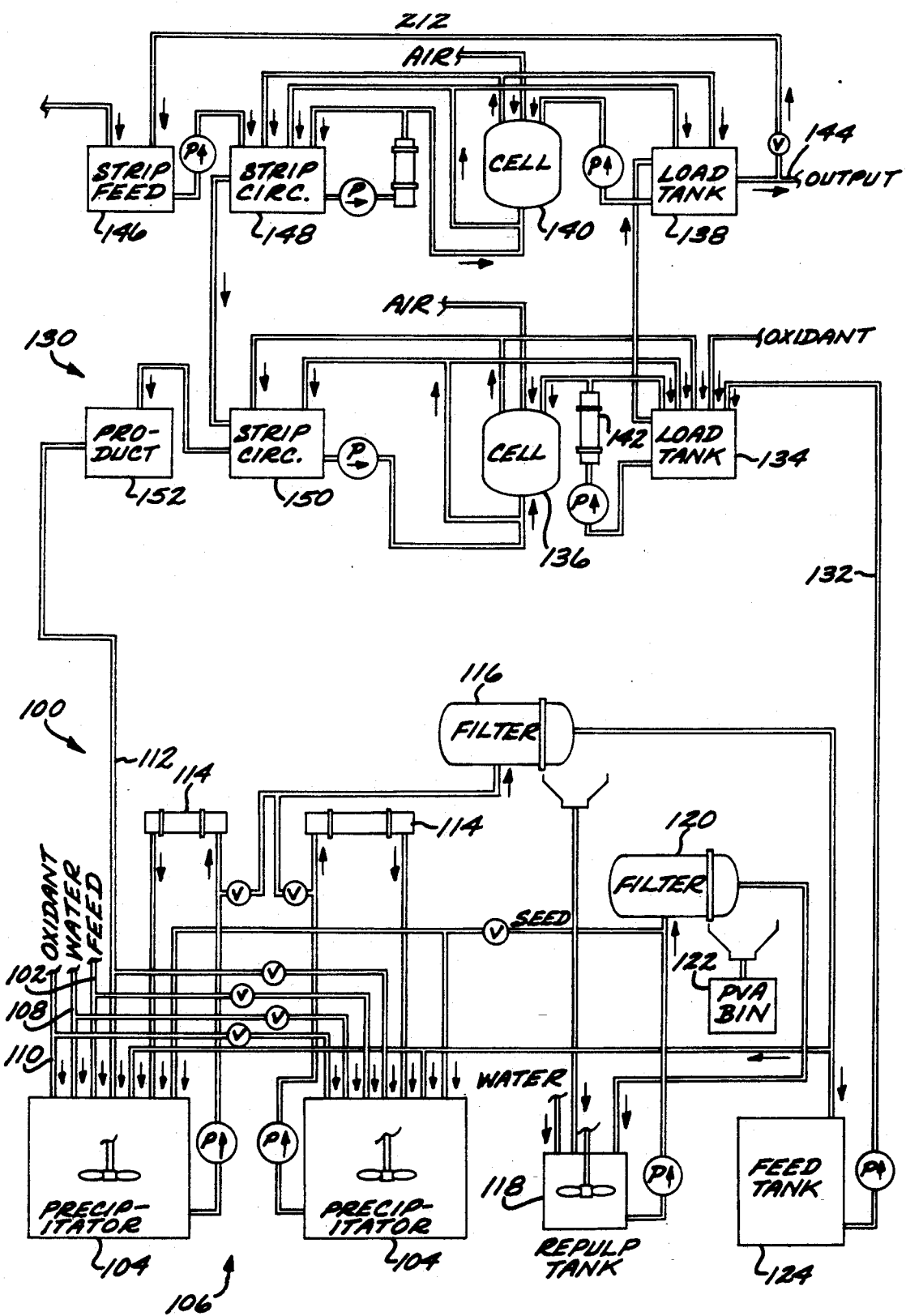
FIG. 2 is a flow chart of a second embodiment of the process of the invention.

Another preferred embodiment is illustrated in the apparatus 100 of FIG. 2. This apparatus 100 utilizes the same basic approach to vanadium removal from phosphoric acid, but with a modified plant and process. This embodiment provides for in-situ stripping of the vanadium from loaded resin, rather than utilizing the movable containers of the apparatus 20, and some other features that may be useful in particular operating circumstances. Tank residence times, oxidants, reducing agents, and other operating parameters of the apparatus 100 are the same as those of the apparatus 20, unless stated to the contrary.

A feed acid stream 102 of about 50-55 percent $P_2O_5$ concentration acid flows from a concentrator (not shown) into a pair of stirred precipitation tanks 104 of a precipitator 106. A dilution water stream 108 also flows into the precipitation tanks 104. The relative flows of feed acid 102 and dilution water 108 are adjusted (in concert with other inflows to the tanks as will be described) so that the composition of the acid in the precipitation tanks 104 is about 42-44 percent $P_2O_5$. Also introduced into the precipitation tanks 104 is an oxidant stream 110 and a strip acid stream 112.

Solid phosphovanadic acid compounds precipitate in the tanks 104. A slurry is pumped from the tanks 104 through an acid cooler 114 that maintains the temperature of the acid at the preselected temperature. A portion of the pumped stream is diverted to a primary filter 116. The filtered solids are mixed with water in a stirred repulp tank 118. A flow of the repulped solids is pumped to a secondary filter 120. The solid particulate from the filter 120 is collected as filter cake 122. The filtrate from the filter 120 is recycled through the repulp tank 118 and the filter 120.

The filtrate from the primary filter 116 is collected in a ion exchange feed tank 124. This acid has a dissolved $V_2O_5$ content of more than 460 parts per million, and typically 500-900 parts per million. This $V_2O_5$ content is readily and consistently reached during the precipitation processing of the acid in the precipitator 106. A small portion of the phosphovanadic acid filter cake is returned to the precipitation tanks 104 to provide precipitation seed crystals. It has been found that, without seeding the acid with phosphovanadic acid crystals, precipitation does occur but is typically difficult to control.

The acid stored in the feed tank 124 is pumped to an ion exchange unit 130, which performs the same functions as the ion exchange unit 40 of FIG. 1 but with a different flow arrangement. The approach of FIG. 2 permits alternate loading and stripping of the loaded ion exchange resin by routing acid flows and without physically moving the containers of ion exchange resin.

An ion exchange input acid stream 132 of phosphoric acid with the vanadium in the oxidized pentavalent or +5 valence state is pumped from the feed tank 124 to a first buffer tank 134 of the ion exchange unit 130. From there, the acid can be pumped either to a first ion exchange cell 136, or to a second buffer tank 138 from which the acid is pumped to a second ion exchange cell 140. The cells 136 and 140 are operated in series, whereby the resin in both cells is simultaneously being loaded with vanadium, or stripped of vanadium. Loading and stripping each require about the same time, 85 minutes in a preferred design, and thereafter the routing is reversed. A heater 142 is provided for the input acid stream leading to the first ion exchange cell 136. As illustrated by the flow path arrows in FIG. 2, vanadium-containing phosphoric acid may be pumped from the first buffer tank 134 through the first ion exchange cell 136 and back to the tank 134. Either simultaneously or at a different time, vanadium-containing phosphoric acid may be pumped from the second buffer tank 138 through the second ion exchange cell 140 and back to the tank 138. These two cycles load vanadium from the oxidized vanadium-containing phosphoric acid into the ion exchange resin in the cells 136 and 140. Phosphoric acid of acceptably low vanadium content is withdrawn from the system through an output line 144.

A small amount of the phosphoric acid from the output line 144 is provided to a strip acid feed tank 146, from which it can be pumped to a second strip acid tank 148 and thence to a first strip acid tank 150. A reducing agent such as elemental iron is added to the strip acid feed tank 146 so that the acid is in a reduced state. When the ion exchange resin in either of the cells 136 or 140 is fully loaded with vanadium, it is shut off from the flow from its respective tank 134 or 138. Any remaining acid is displaced from the ion exchange cells 136 and 140 with pressurized air. Reduced valence state strip acid from the respective tank 150 or 148 is pumped through the cells 136 or 140, reducing the vanadium on the ion exchange resin within the cells 136 or 140 and causing it to transfer from the resin to the reduced acid. The ion exchange resin is thereby regenerated and prepared for further ion exchange reactions. The vanadium-enriched strip acid is pumped to a vanadium-enriched strip acid tank 152, from which it is then provided as the strip acid stream 112 to the precipitation tanks 104.

The following Examples are intended to illustrate aspects of the invention, but should not be interpreted as limiting of the invention in any respect.

EXAMPLE 1

Samples of 68 percent $P_2O_5$ phosphoric acid containing 2509 parts per million (ppm) $V_2O_5$ were diluted to various $P_2O_5$ concentrations. A sample of 100 milliliters of each diluted acid was contacted to 10 grams of Duolite A 368 weak base macroporous anion resin at a temperature of 52° C. The concentration of vanadium expressed as $V_2O_5$ in parts per million ("ppm") was determined initially ("init"), and after 60 minutes ("60 min") of contact to the resin, and from this information the weight ratio of phosphorus to vanadium ("P/V") was calculated at each point in time. The results are summarized in the following table:

TABLE I

| $P_2O_5$ conc (%) | $V_2O_5$ (ppm, init) | P/V init | $V_2O_5$ (ppm, 60 min) | P/V (60 min) |
|---|---|---|---|---|
| 32.0 | 1399 | 178 | 815 | 306 |
| 41.9 | 1593 | 205 | 1135 | 288 |
| 47.0 | 1718 | 213 | 1578 | 232 |
| 52.0 | 1885 | 215 | 1931 | 210 |

There was very little removal of vanadium oxide from the acid having 52 percent $P_2O_5$ (which through measurement variation actually showed a greater vanadium oxide content after the treatment). A small amount of the vanadium oxide was removed from the 47.0 percent acid, and the removal became progressively larger with decreased phosphate concentration.

The determining consideration for the treated acid is the P/V ratio after the treatment. The results show that the P/V ratio for the treated acid having 32.0 percent $P_2O_5$ is approximately the same as for the acid having 41.9 percent $P_2O_5$. However, treatment of the 41.9 percent $P_2O_5$ acid reduces the size of the treatment equipment substantially, thereby improving process economics. It is judged that an optimal $P_2O_5$ content for the acid to be treated is from about 40 to about 45 percent. At $P_2O_5$ contents below 40 percent, process economics are significantly adversely affected, while for contents above 45 percent the vanadium removal is unacceptable reduced.

EXAMPLE 2

Samples of 42 percent $P_2O_5$ phosphoric acid were prepared by dilution from 68 percent acid (superphosphoric acid). The initial $V_2O_5$ concentration of the 42 percent acid was 1510 ppm. The 42 percent acid was contacted to Duolite A 368 ion exchange resin in varying ratios of acid to resin, at a temperature of 52° C. and for a period of time of 90 minutes. It was found that the removal of vanadium oxide from the phosphoric acid to the resin was dependent upon the weight ratio of acid to resin, as shown in the following table

TABLE II

| Acid/Resin (weight) | $V_2O_5$ (ppm) |
|---|---|
| 15.2 | 829 |
| 7.5 | 810 |
| 3.0 | 480 |

The weight ratio of 3.0 therefore produces acid that falls just short of achieving the objective of 460 ppm (the requirement for animal feed applications) in 90 minutes. It is estimated that for this particular feed acid and temperature of contacting, a weight ratio of just under 3.0, or about 2.5, would be required to reach a $V_2O_5$ concentration of 460 ppm in 90 minutes.

This example illustrates the approach for determining process design features. Exact process parameters will depend upon the initial $V_2O_5$ concentration of the acid provided to the ion exchange process step, the type and amount of resin utilized, and the time and temperature of contacting. Since the initial $V_2O_5$ concentration is determined by the concentration in the filtrate flowing from the precipitator, the precipitator and ion exchange units are mutually optimized.

EXAMPLE 3

A pilot plant apparatus 100 was constructed according to the flow chart of FIG. 2 to verify the operability of the process. This example reports results for pilot plant operation.

Clarified merchant grade phosphoric acid of 53 percent $P_2O_5$ was used as the input material. The acid had 1600 ppm $V_2O_5$ and exhibited an initial EMF of 460 mv (Ag/AgCl electrode) and a specific gravity of 1.676. The acid was stabilized by dilution with well water to a specific gravity of 1.53, corresponding to about 42–44 percent $P_2O_5$. A quantity of 108 liters of this diluted acid was transferred to a stirred stainless steel tank. The acid was oxidized by adding 99.6 grams of manganese dioxide, and thereafter cooled to 96° F. and seeded with previously obtained phosphovanadic acid filter cake. After about 18 hours of aging the slurry was filtered on a small horizontal pressure leaf filter. The filtrate assayed 599 ppm $V_2O_5$, which is substantially lower than the initial acid content but which is not sufficiently low for use in animal feed applications.

The filtrate was contacted with ion exchange resin in cells and with a cycle depicted in FIG. 2 and discussed previously. Two resin cells each containing 1400 milliliters of A 368 resin were used. The circulation tanks all contained 12.0 liters of reduced or oxidized acid, and the acid temperature was maintained at 132° F. During the 90 minute load cycle, the filtrate was pumped from the ion exchange feed tank 124 into the first load tank 134. Oxidized 42-44 percent $P_2O_5$ acid (950-1000 mv) was circulated through the ion exchange cells at a flow rate of 800 milliliters per minute and returned to the tanks from which it was pumped. Low-vanadium product acid was collected from the overflow of the second load tank 138 and analyzed. Following the 90 minute load cycle the resin was rinsed and subjected to a 90 minute strip/regeneration cycle, wherein reduced 42-44 percent $P_2O_5$ acid (300-400 mv) was circulated through the resin cells at a flow rate of 800 milliliters per minute.

A number of complete cycles of loading and strip/regeneration were performed. The following table reports results after 34-37 cycles to illustrate the steady-state performance of the system.

TABLE III

| | Product Acid | | Strip Acid | |
|---|---|---|---|---|
| Cycle No. | $V_2O_5$ ppm | weight (kg) | $V_2O_5$ ppm | weight (kg) |
| 34 | 407 | 9.55 | 1128 | 1.13 |
| 35 | 398 | 9.62 | 1137 | 1.14 |
| 36 | 391 | 9.37 | 1184 | 1.10 |
| 37 | 392 | 9.96 | 1171 | 1.17 |

In this initial pilot plant operation, the $V_2O_5$ content of the product acid was reduced below the requirement for animal feed, indicating that the radio of resin to acid could be reduced, or other process variables may be altered. The pilot plant demonstrates the operability of the process, and that the $V_2O_5$ content remains relatively constant from cycle to cycle, as does that of the strip acid.

The present invention provides an important advance in the treatment of phosphoric acid to reduce vanadium content of the acid. A combination of vanadium reduction and process economics not previously achievable are attained with the approach of the invention. Although particular embodiments of the invention have been described in detail for purposes of illustration, various modifications may be made without departing from the spirit and scope of the invention. Accordingly, the invention is not to be limited except as by the appended claims.

What is claimed is:

1. A process for removing vanadium from phosphoric acid, comprising the steps of:
   precipitating a compound containing vanadium and phosphorus from a process-feed phosphoric acid having the vanadium in the pentavalent oxidation state;
   separating the precipitated compound from the phosphoric acid;
   removing additional vanadium from the phosphoric acid by contacting the phosphoric acid resulting from the step of separating to an ion exchange resin to produce a product phosphoric acid having reduced vanadium content;
   stripping vanadium from the ion exchange resin by contacting phosphoric acid stripping solution to the ion exchange resin in the presence of a reducing agent that reduces the vanadium ions to the trivalent and tetravalent oxidation state;
   oxidizing the vanadium-loaded stripping solution, together with makeup vanadium-containing fresh phosphoric acid, so that the vanadium is in the pentavalent oxidation state, the mixture of stripping solution and makeup acid having a $P_2O_5$ content of no more than about 47 percent; and
   supplying the oxidized mixture of stripping solution and makeup acid to the step of precipitating as the process-feed phosphoric acid.

2. The process of claim 1, including the additional step of adjusting the phosphate content of the mixture of stripping solution and makeup acid to have a phosphate content of from about 40 to about 45 percent.

3. The process of claim 1, including the additional step of diluting vanadium-containing phosphoric acid having a phosphate content of more than about 45 percent with water to form the fresh phosphoric acid having a phosphate content of no more than about 45 percent.

4. The process of claim 1, wherein the ion exchange resin of the step of stripping is held within a plurality of containers arranged in a series of stages, and the flow of makeup phosphoric acid is added after the first stage but before the last stage.

5. The process of claim 1, wherein a portion of the precipitated compound separated in the step of separating is added to the process-feed phosphoric acid in the step of precipitating, to promote precipitation of the compound containing vanadium.

6. A process for removing vanadium from phosphoric acid, comprising the steps of:
   providing an apparatus comprising
      precipitator means for processing vanadium-containing process-feed phosphoric acid having a phosphate content of no more than about 45 percent, the precipitator means including oxidant addition means for adding an oxidant to the process-feed phosphoric acid to place the vanadium ions in the acid into the pentavalent oxidation state, whereupon precipitates containing vanadium are formed in a phosphoric acid slurry,
      separation means for separating the precipitates from the phosphoric acid slurry to remove vanadium from the phosphoric acid stream and to form a vanadium-reduced ion exchange feed,
      ion exchange means for processing the ion exchange feed, the ion exchange means including contacting means for holding ion exchange resin and for contacting the ion exchange feed to the ion exchange resin to produce a phosphoric acid product of reduced vanadium content, a first portion of the phosphoric acid product being removed from the apparatus for further use, and ion exchange resin strip means for stripping vanadium from the ion exchange resin in the contacting means, the ion exchange resin strip means including means for contacting a second portion of the phosphoric acid product to the vanadium-loaded ion exchange resin, and means for adding a reducing agent to the second portion of the phosphoric acid product so that vanadium ions in the acid are reduced to the trivalent and tetravalent states and transferred from the ion exchange resin to the second portion of the phosphoric acid product; and providing to the apparatus phosphoric acid having a phosphate content of no more than about 47 percent and containing vanadium as an impurity to remove vanadium from the phosphoric acid.

7. The process of claim 6, including the additional step of adding an oxidant to the ion exchange feed to ensure that the vanadium ions are in the pentavalent oxidation state.

8. The process of claim 6, including the additional step of adding the vanadium-containing phosphoric acid produced by the ion exchange resin strip means to the precipitator means.

9. The process of claim 6, wherein the process-feed phosphoric acid is added directly to the precipitator means.

10. The process of claim 6, wherein the process-feed phosphoric acid is added to and combined with the second portion of phosphoric acid product in the ion exchange resin strip means.

11. The process of claim 6, wherein the precipitator means includes a precipitation tank with a stirrer therein.

12. The process of claim 6, wherein the apparatus further includes
means for diluting phosphoric acid having a phosphate content of more than about 45 percent with water to form the process-feed phosphoric acid having a phosphate content of no more than about 45 percent.

13. The process of claim 6, wherein the contacting means includes at least two containers of an ion exchange resin.

14. The process of claim 6, including the additional step of adding an oxidant to the ion exchange feed to ensure that the vanadium ions are in the pentavalent oxidation state.

15. The process of claim 6, wherein the ion exchange resin strip means includes a plurality of containers of an ion exchange resin arranged in stages, and the means for adding a reducing agent permits addition of the reducing agent at each stage.

16. A process for removing vanadium from phosphoric acid, comprising the steps of:
providing an apparatus comprising
a precipitator that receives vanadium-containing process-feed phosphoric acid and adds an oxidant to the process-feed phosphoric acid to place the vanadium ions in the acid into the pentavalent oxidation state, whereupon solid precipitates containing phosphates and vanadium are formed in a phosphoric acid filter feed slurry, a filter that receives the filter feed slurry from the precipitator and removes solid precipitate therefrom to produce a phosphoric acid filtrate having a reduced vanadium content, an ion exchange unit that receives the filtrate phosphoric acid from the filter and contacts the filtrate phosphoric acid to an ion exchange resin supported in containers within the ion exchange unit, thereby removing additional vanadium from the filtrate phosphoric acid by loading vanadium onto the ion exchange resin to produce a phosphoric acid product of reduced vanadium content, a first portion of the phosphoric acid product being removed from the apparatus for further use, and an ion exchange resin strip unit that controllably and intermittently contacts a second portion of the phosphoric acid product to the vanadium-loaded ion exchange resin, adds a reducing agent to the second portion of the phosphoric acid product so that vanadium ions in the acid are reduced to the trivalent and tetravalent states and transferred from the ion exchange resin to the second portion of the phosphoric acid product, and provides the vanadium-containing second portion of the phosphoric acid product to the precipitator as part of the process-feed phosphoric acid; and providing to the apparatus phosphoric acid having a phosphate content of no more than about 47 percent containing vanadium as an impurity to remove vanadium from the phosphoric acid.

17. The process of claim 16, including the additional step of adding an oxidant to the filtrate phosphoric acid in the ion exchange unit to ensure that the vanadium ions are in the pentavalent oxidation state.

18. The process of claim 16, further including the step of diluting vanadium-containing phosphoric acid having a phosphate content of more than about 45 percent to a phosphate content of less than about 45 percent, the resulting diluted vanadium-containing phosphoric acid forming at least a portion of the process-feed phosphoric acid.

19. The process of claim 16, wherein the ion exchange resin strip unit is physically separated from the ion exchange unit, and the containers of vanadium-loaded ion exchange resin are movable so that they may be moved form the ion exchange unit to the ion exchange resin strip unit.

20. The process of claim 16, wherein the ion exchange resin strip unit is integrated with the ion exchange unit and the containers are stationary, and including the additional step of
directing the second portion of the phosphoric acid product through the containers of vanadium-loaded ion exchange resin.

* * * * *